US009791298B2

(12) United States Patent
Kadoike et al.

(10) Patent No.: US 9,791,298 B2
(45) Date of Patent: Oct. 17, 2017

(54) ROTATION ANGLE DETECTOR

(71) Applicant: DENSO CORPORATION, Kariya, Aichi-pref. (JP)

(72) Inventors: Yuuta Kadoike, Kariya (JP); Shuhei Miyachi, Kariya (JP); Takafumi Satou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 99 days.

(21) Appl. No.: 14/990,671

(22) Filed: Jan. 7, 2016

(65) Prior Publication Data
US 2016/0202087 A1 Jul. 14, 2016

(30) Foreign Application Priority Data
Jan. 9, 2015 (JP) .................................... 2015-3305

(51) Int. Cl.
| G01B 7/00 | (2006.01) |
| G01B 7/30 | (2006.01) |
| G01D 5/20 | (2006.01) |
| G01B 21/04 | (2006.01) |

(52) U.S. Cl.
CPC .................. *G01D 5/20* (2013.01); *G01B 7/30* (2013.01); *G01B 21/045* (2013.01)

(58) Field of Classification Search
CPC .......... G01D 5/20; G01D 5/145; G01D 5/245; G01D 5/04; G01D 5/2448; G01D 5/2449; G01B 7/30; G01B 21/045; G01B 7/31; B62D 5/046; B62D 5/049; B62D 5/003; B62D 5/04; B62D 5/0481; B62D 5/0463; B62D 5/0484
See application file for complete search history.

(56) References Cited

U.S. PATENT DOCUMENTS

| 9,475,520 B2 * | 10/2016 | Yanai ..................... G01D 5/145 |
| 2012/0031697 A1 | 2/2012 | Matsuda | |
| 2012/0078560 A1 * | 3/2012 | Satou ................... G01D 5/2449 702/94 |
| 2013/0033207 A1 * | 2/2013 | Satou ..................... B62D 5/046 318/400.04 |

* cited by examiner

*Primary Examiner* — Minh N Tang
(74) *Attorney, Agent, or Firm* — Knobbe, Martens, Olson & Bear, LLP

(57) ABSTRACT

A rotation angle detector has a rotation angle sensor and a microcomputer, where the sensor detects a change of a magnetic field of a magnet that rotates with a shaft. The microcomputer has a first corrector for correcting a pre-correction mechanical angle, based on a first correction value that corrects an error due to an assembly process for assembling the magnet and the sensor, and a second corrector for correcting the pre-correction mechanical angle based on a second correction value that corrects an error due to a spill magnetic flux that is generated by a supply of an electric current to a winding wire. In such configuration, the rotation angle detector may correct the error due to the spill magnetic flux, thereby enabling an accurate detection of a mechanical angle.

7 Claims, 12 Drawing Sheets

ROTATION ANGLE DETECTOR

CROSS REFERENCE TO RELATED APPLICATION

The present application is based on and claims the benefit of priority of Japanese Patent Application No. 2015-003305, filed on Jan. 9, 2015, the disclosure of which is incorporated herein by reference.

TECHNICAL FIELD

The present disclosure generally relates to a rotation angle detector.

BACKGROUND INFORMATION

Conventionally, a rotation angle of a motor is detected by a magnetic sensor. For example, in the magnetic sensor disclosed in a patent document, Japanese Patent Laid-Open No. 2012-39737 (patent document 1), based on an assumption of musing two pairs of conductive wires, the corresponding phases are arranged to be point-symmetric to the magnetic sensor, which cancels a spill magnetic flux caused by an electric current flowing in the conductive wire, for the improvement of the detection accuracy of the rotation angle.

However, according to the patent document 1, an error of the detection angle is caused due to an assembly error of the magnet that rotates together with the shaft, the magnetic sensor, and the conductive wire (i.e., the position and/or the angle of those components shifted from an intended one). Further, when the conductive wires cannot be positioned as point-symmetric with each other due to a restriction of a manufacturing process or the like, the magnetic flux generated by the electric current flowing in the wire causes an error of the detected rotation angle.

SUMMARY

It is an object of the present disclosure to provide a rotation angle detector that has an improved accuracy for detecting the rotation angle of the rotating electric machine having a shaft, a rotor rotating with the shaft and a stator that has a winding wire wound thereon.

In an aspect of the present disclosure, a rotation angle detector for detecting a rotation angle of a rotating electric machine that has a shaft, a rotor rotating with the shaft, and a stator having a winding wire wound on the stator. The rotation angle detector includes a sensor part and a controller. The sensor part senses a change of a magnetic field of a detectee that rotates with the shaft. The controller includes a pre-correction angle calculator, a first corrector, and a second corrector. The pre-correction angle calculator calculates a pre-correction mechanical angle based on a detection value of the sensor part. The first corrector corrects the pre-correction mechanical angle based on a first correction value that corrects an error of angle caused by an error in an assembly process for assembling the detectee and the sensor part. The second corrector corrects the pre-correction mechanical angle based on a second correction value that corrects an error of angle due to a spill magnetic flux that is generated by a supply of an electric current to the winding wire.

According to the present disclosure, by correcting the pre-correction mechanical angle by using the first correction value, an initial error caused by an assembly process (i.e., an error in the assembly process) is appropriately corrected. Further, an error of angle due to the spill magnetic flux generated by the electric current is corrected by using the second correction value. In such manner, even in case that, due to the restriction of manufacturing, for example, the connection lines connected with the winding wires cannot be positioned at mutually-cancelling positions (i.e., for mutually cancelling the spill magnetic flux generated from the winding wires), which may be achieved by a point-symmetric arrangement to each other, the error of angle due to the spill magnetic flux is appropriately corrected. Therefore, regardless of the position and/or the structure of the components, the rotation angle of the rotating electric machine is accurately detected.

When a connection line is disposed on a mounting surface on which the sensor part is mounted, the influence of the spill magnetic flux is relatively great. Therefore, in such case, the correction by the second correction value is especially effective.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A rotation angle detector according to the present disclosure is described in detail with reference to the drawings.

First Embodiment

The rotation angle detector in the first embodiment of the present disclosure is described based on FIGS. 1-13.

As shown in FIGS. 1-8, a rotation angle detector 1 of the present embodiment detects a rotation angle of a motor 10 that serves as a rotating electric machine. The motor 10 is used in an electric power steering device 2 for assisting the steering operation by the driver.

Figure 1:
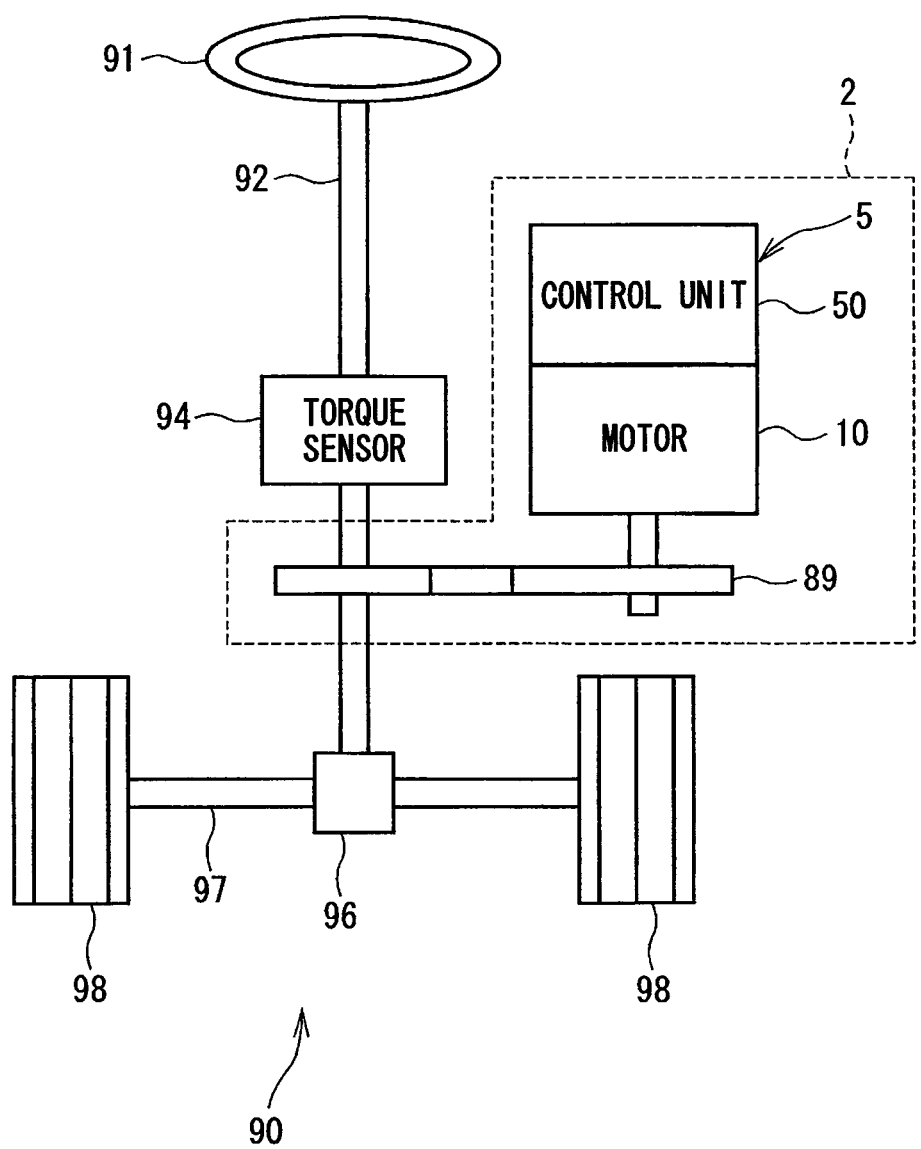
FIG. 1 is an illustration diagram of an electric power steering system in a first embodiment of present disclosure.

FIG. 1 shows a configuration of a steering system 90 that is provided with the electric power steering device 2. The steering system 90 comprises a steering wheel 91, a steering shaft 92, a pinion gear 96, a rack shaft 97, a wheel 98, and the electric power steering device 2 together with other components.

The steering wheel 91 is connected with the steering shaft 92. The steering shaft 92 has a torque sensor 94 that detects a steering torque that is inputted to the steering wheel 91 when a driver steers the steering wheel 91. The pinion gear 96 is disposed at the tip of the steering shaft 92, and the pinion gear 96 engages with the rack shaft 97. A pair of wheels 98 are connected with the both ends of the rack shaft 97 via a tie rod, etc. Thereby, when the driver rotates the steering wheel 91, the steering shaft 92 connected to the steering wheel 91 rotates, and the rotational movement of the steering shaft 92 is turned into translational movement of the rack shaft 97 by the pinion gear 96, and the pair of wheels 98 are steered by an angle according to the amount of movement of the rack shaft 97.

The electric power steering device 2 is provided with a drive device 5, which has the motor 10, a control unit 50, and the like, and is also provided with, as a "rotation object," a speed reduction gear 89 that reduces the rotation speed of the motor 10 for the transmission of the rotation to the steering shaft 92, or to the rack shaft 97.

The motor 10 is driven by receiving an electric current from a battery 8 (see FIG. 2), and rotates the speed reduction gear 89 back and forth in a reciprocal manner.

Figure 2:
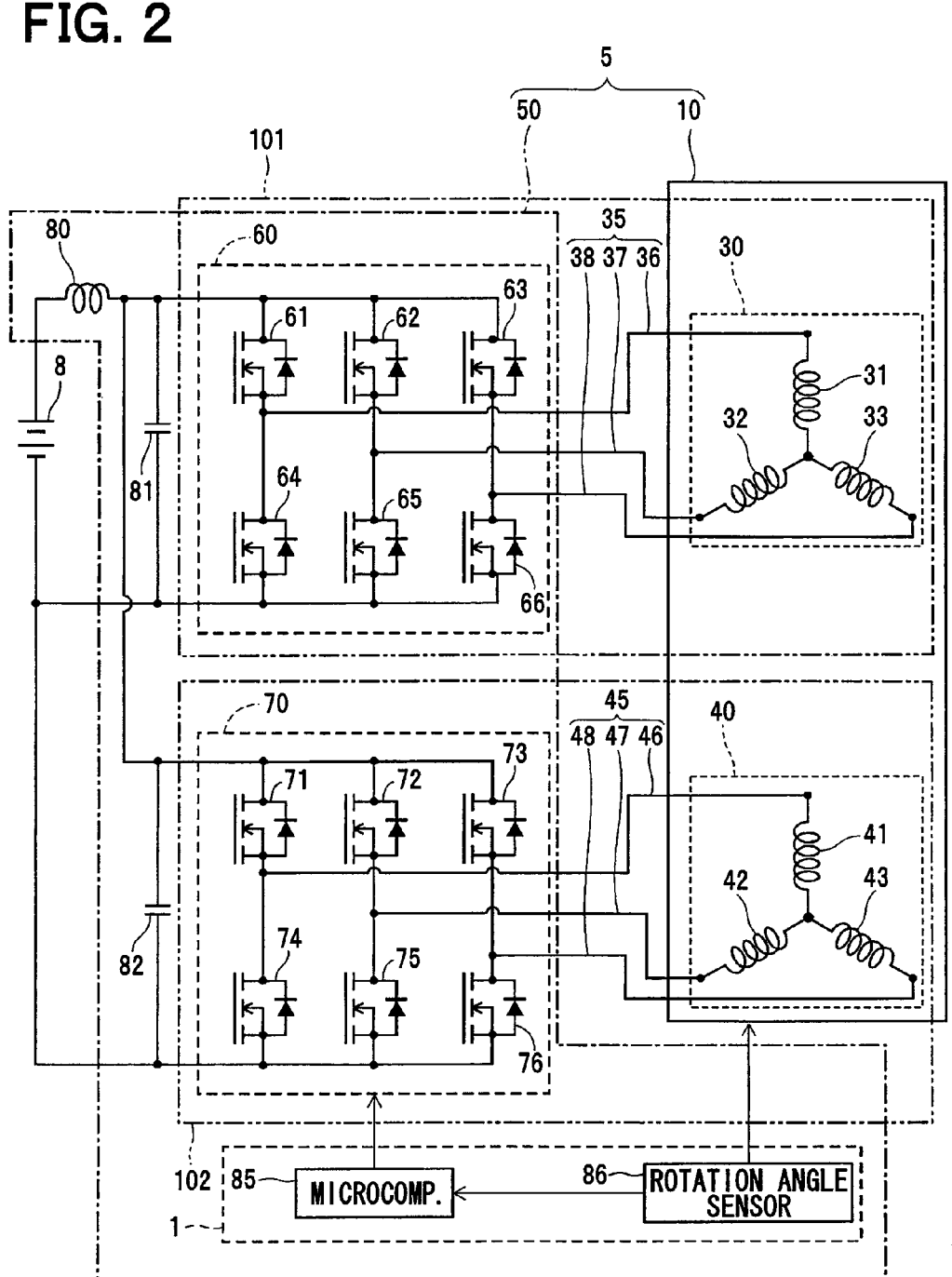
FIG. 2 is a circuit diagram of a drive device in the first embodiment of present disclosure.
Figure 3:
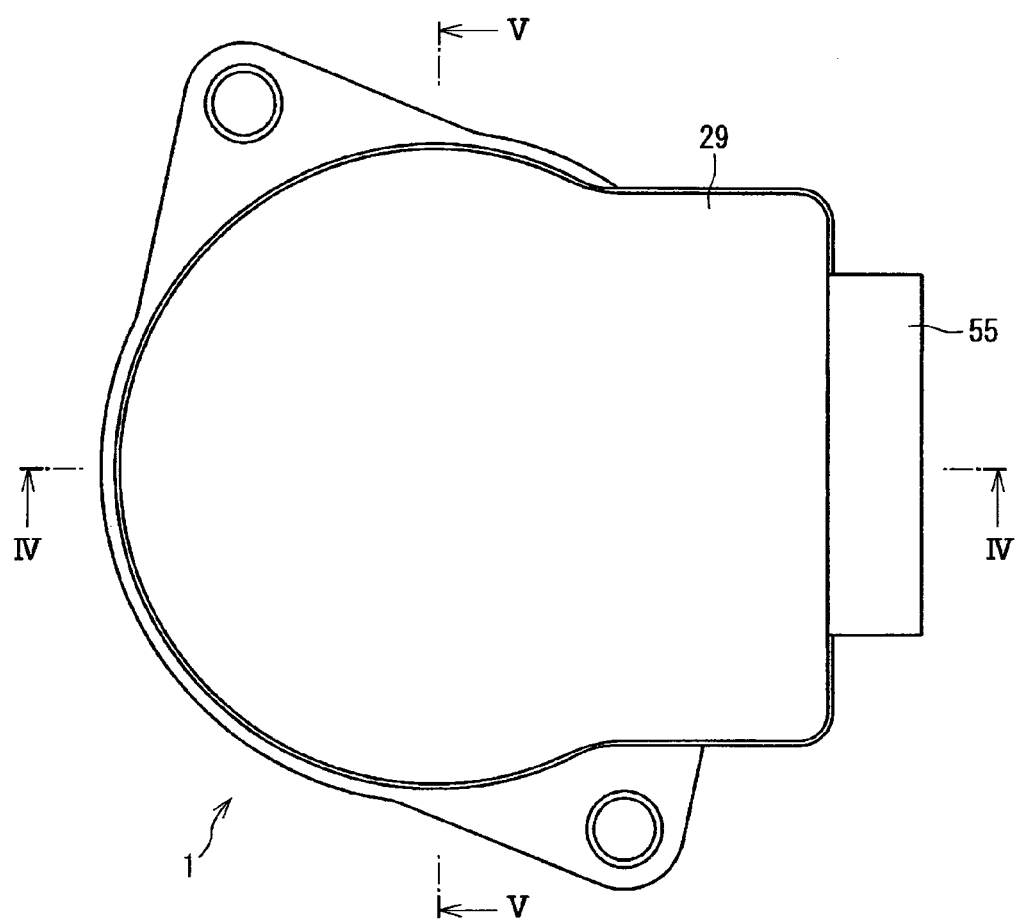
FIG. 3 is a plan view of the drive device in the first embodiment of present disclosure.
Figure 4:
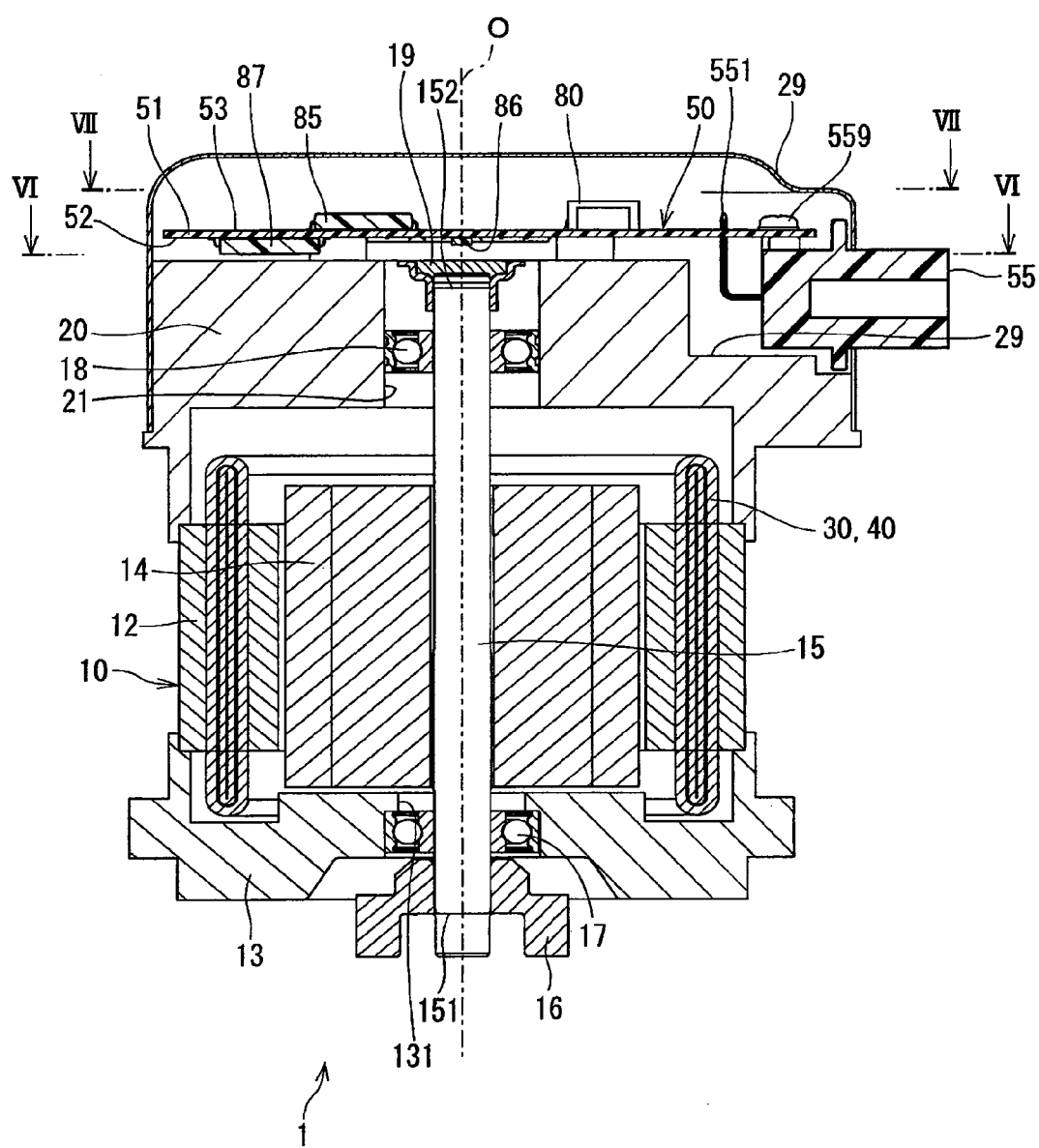
FIG. 4 is a IV-IV line sectional view of FIG. 3.
Figure 5:
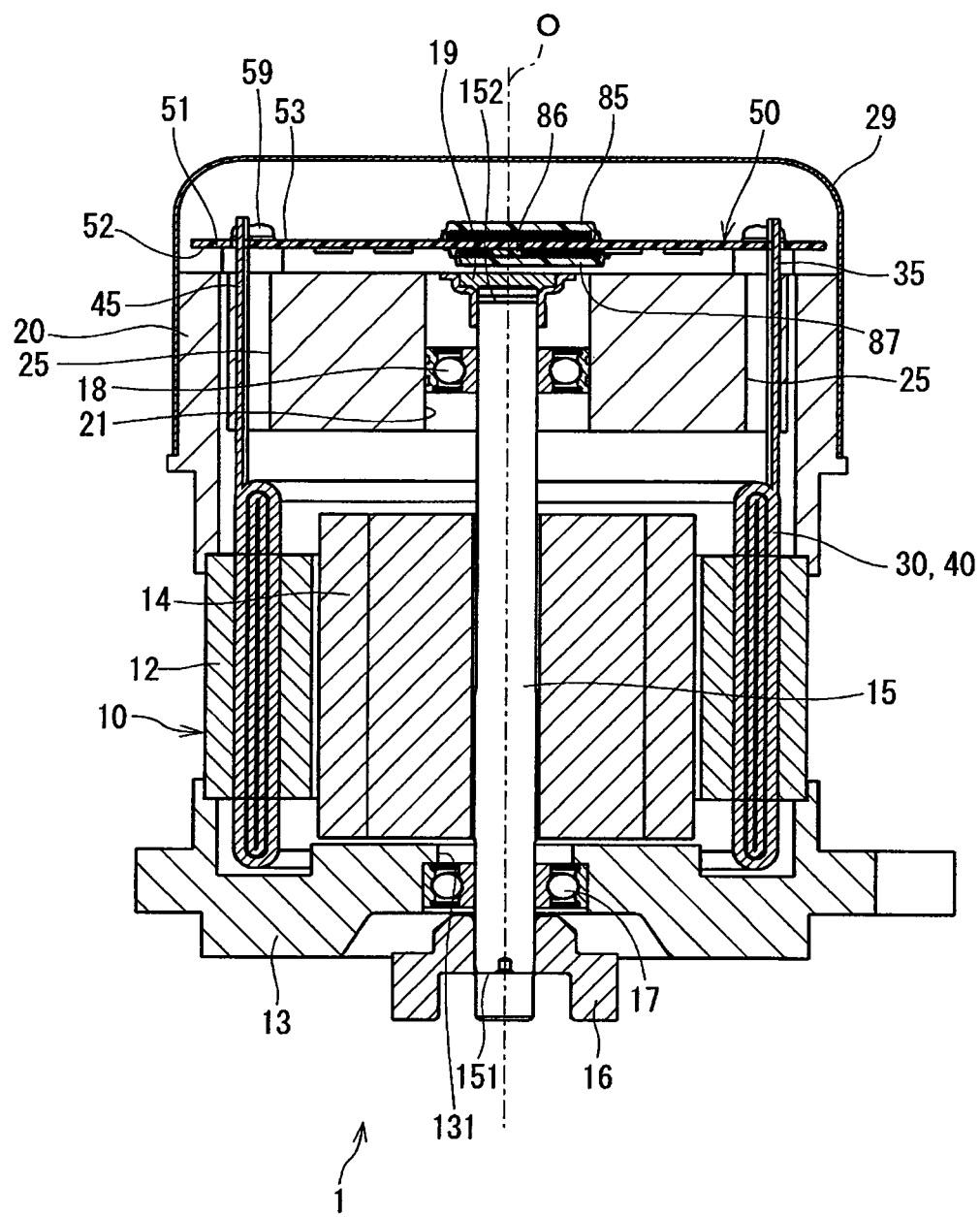
FIG. 5 is a V-V line sectional view of FIG. 3.
Figure 6:
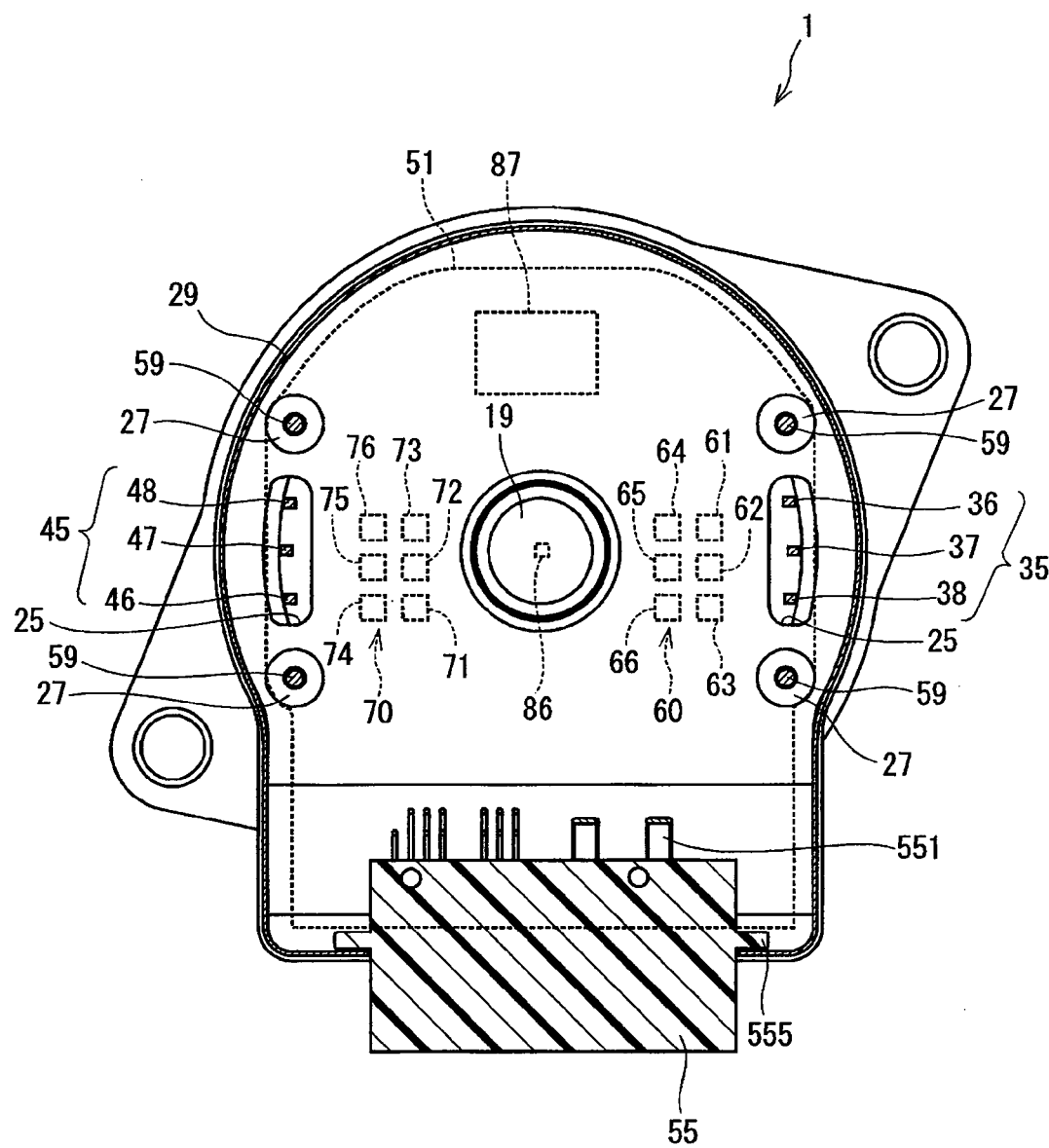
FIG. 6 is a VI-VI line sectional view of FIG. 4.
Figure 7:
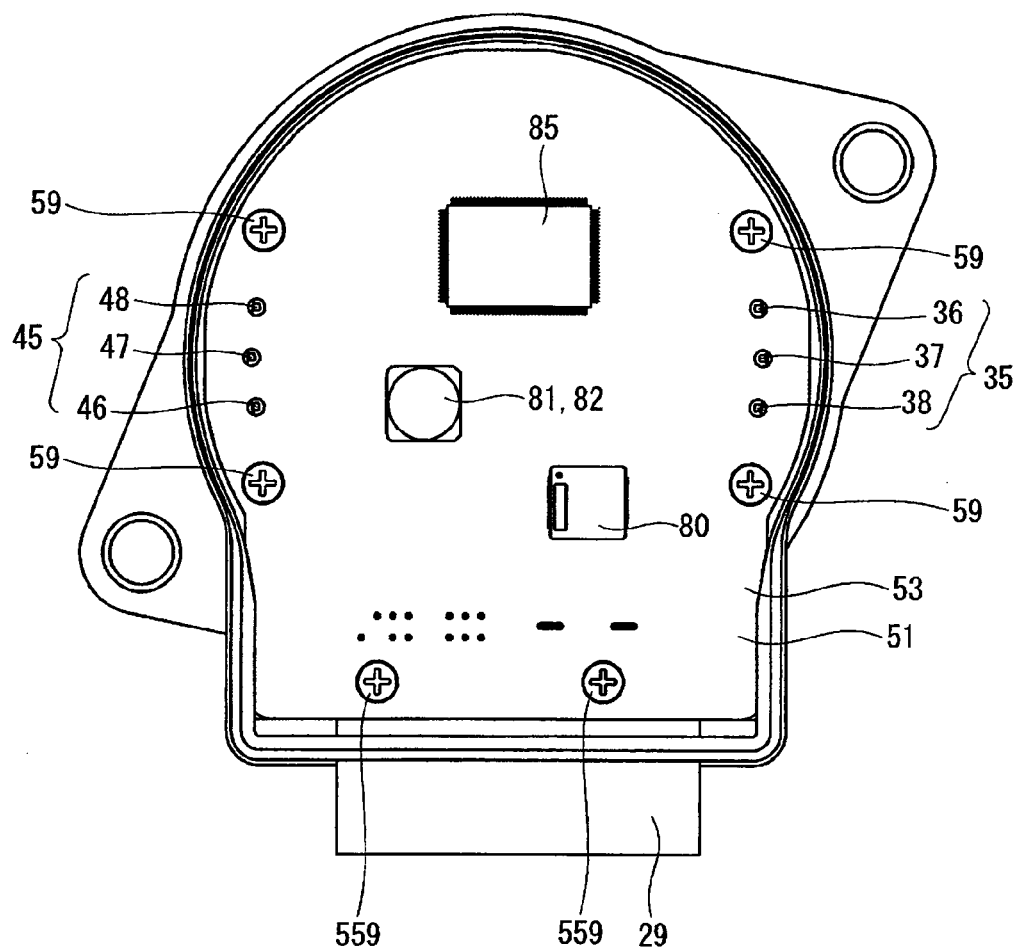
FIG. 7 is a VII-VII line sectional view of FIG. 4.

The circuit configuration of the drive device 5 is shown in FIG. 2.

As shown in FIG. 2, the motor 10 is a three-phase brushless motor, and has a first winding group 30 and a second winding group 40. In the present embodiment, the first winding group 30 and the second winding group 40 correspond respectively to a "winding wire," and are designated as "windings 30 and 40" in the following description.

In the present embodiment, a circuit for a control of the first winding group 30 is a first system 101, and a circuit of a control of the second winding group 40 is a second system 102.

The first winding group 30 comprises a U1 coil 31, a V1 coil 32, and a W1 coil 33, and the second winding group 40 includes a U2 coil 41, a V2 coil 42, and a W2 coil 43.

In the present embodiment, the electric current flowing in the U1 coil 31 is a U1 electric current Iu1, the electric current flowing in the V1 coil 32 is a V1 electric current Iv1, and the electric current flowing in the W1 coil 33 is a W1 electric current Iw1.

Further, the electric current flowing in the U2 coil 41 is a U2 electric current Iu2, the electric current flowing in the V2 coil 42 is a V2 electric current Iv2, and the electric current flowing in the W2 coil 43 is a W2 electric current Iw2.

The control unit 50 includes electronic components mounted on a substrate 51 (see FIG. 4 or the like), and is provided with the rotation angle detector 1, a first inverter 60, a second inverter 70, a choke coil 80, capacitors 81 and 82, Application-Specific Integrated Circuit (ASIC) 87 (see FIG. 6), etc.

The rotation angle detector 1 is provided with a rotation angle sensor 86 as a "sensor part," and a microcomputer 85 as a "controller."

Bridge connection of six switching elements 61-66 makes up the first inverter 60, which is connected with the first winding group 30 by a first motor line 35.

The first motor line 35 comprises a U1 motor line 36, a V1 motor line 37, and a W1 motor line 38. The U1 motor line 36 connects (i) a junction point between a switching element 61 connected to a high potential side of the U phase and a switching element 64 connected to a low potential side of the U phase to (ii) the U1 coil 31.

The V1 motor line 37 connects (i) a junction point between a switching element 62 connected to the high potential side of the V phase and a switching element 65 connected to the low potential side of the V phase to (ii) the V1 coil 32.

The W1 motor line 38 connects (i) a junction point between a switching element 63 connected to the high potential side of the W phase and a switching element 66 connected to the low potential side of the W phase to (ii) the W1 coil 33.

Bridge connection of the six switching elements 71-76 makes up the second inverter 70, which is connected with the second winding group 40 by a second motor line 45.

The second motor line 45 includes a U2 motor line 46, a V2 motor line 47, and a W2 motor line 48.

The U2 motor line 46 connects (i) a junction point between a switching element 71 connected to the high potential side of the U phase and a switching element 74 connected to the low potential side of the U phase to (ii) the U2 coil 41.

The V2 motor line 47 connects (i) a junction point between a switching element 72 connected to the high potential side of the V phase and a switching element 75 connected to the low potential side of the V phase to (ii) the V2 coil 42.

The W2 motor line 48 connects (i) a junction point of a switching element 73 connected to the high potential side of the W phase and a switching element 76 connected to the low potential side of the W phase to (ii) the W2 coil 43.

In the present embodiment, the motor lines 35 and 45 correspond to the "connection line."

The choke coil 80 and the capacitors 81 and 82 constitute a power filter, and reduce the noise transmitted from the other devices which share the battery 8, and also reduces the noise which may otherwise be transmitted to the other devices sharing the battery 8.

The microcomputer 85 conducts a total control of the motor 10, performing various calculations and the like based on the torque detection value inputted from the torque sensor 94, the detection value inputted from the rotation angle sensor 86, etc.

The rotation angle sensor 86 is implemented as a magneto-resistive element. The rotation angle sensor 86 of the present embodiment is constituted by the Tunnel Magnetoresistance (TMR) element, the (Anisotropic Magnetoresistance (AMR) element or the Giant Magnetoresistance (GMR) element may also be used.

The rotation angle sensor 86 detects the size and the direction of the magnetic field, and outputs a detection value to the microcomputer 85. In the microcomputer 85, a mechanical angle θm, which is the rotation angle of a rotor 14 (see FIG. 4), is calculated based on the detection value obtained from the rotation angle sensor 86. The details of the detection method of the mechanical angle θm are described later.

The motor 10 is provided with a stator 12, a front frame end 13, the rotor 14, a shaft 15, a rear frame end 20 and the like, as shown in FIGS. 3-7.

The stator 12 has a stator core, and the stator core has a winding of the first winding group 30 and the second winding group 40 (refer to FIG. 4) respectively wound thereon. The first winding group 30 is connected with the first motor line 35, and the second winding group 40 is connected with the second motor line 45.

The first motor line 35 and the second motor line 45 are inserted into a motor line extraction part 25 that is formed on the rear frame end 20, are taken out toward a control unit 50 side, and are connected with the substrate 51.

The front frame end 13 is fixedly attached onto the stator 12 by fitting or the like (i.e., onto an opposite side of the stator 12 relative to the control unit 50).

The rotor 14 is rotatably disposed on a radial inside of the stator 12 substantially coaxially, and the rotor 14 in a cylinder form is magnetized so that an N pole and an S pole appear alternatingly on a surface of the stator 12. In the present embodiment, five pairs of the N pole and the S pole are provided, which are 10 poles in total.

The shaft 15 is made with, for example, metal, and is fixed at an axial center of the rotor 14. The shaft 15 is rotatably supported by a bearing 17 that is fixed to the front frame end 13, and also by a bearing 18 that is fixed to the rear frame end 20. In such configuration, the shaft 15 rotates together with the rotor 14. In the present embodiment, an imaginary line, which is an extension of the axial center of the shaft 15 is designated as a "motor shaft line O."

A one end 151 of the shaft 15, which is opposite to the control unit 50, is inserted into a hole 131 that is formed substantially at the center of the front frame end 13. Further, an output shaft 16 is formed on the one end 151 of the shaft 15. The output shaft 16 is connected with the speed reduction gear 89 (see FIG. 1). Thereby, the rotation of the rotor 14 and the shaft 15 rotating as one body is transmitted to the steering shaft 92 via the speed reduction gear 89.

A magnet 19, as a component to be detected (i.e., as a detectee), is formed on an other end 152, which is one end of the shaft 15 closer to the control unit 50. The magnet 19 is formed in a circular disk shape substantially, and is a permanent magnet having one pair of N pole and S pole, which are arranged along the diameter line of the permanent magnet. The center in the surface of the magnet 19 is positioned on the motor shaft line O, and the magnet 19 is disposed in parallel with the substrate 51 that is to be mentioned later.

The rear frame end 20 is made with a thermally-conductive material (e.g. aluminum), and is fixed onto an opposite side of the stator 12 relative to the front frame end 13 by fitting or the like. A hole 21 is formed on the rear frame end 20, (i.e., at the axial center of the rear frame end 20). The bearing 18 is disposed in the hole 21, and the other end 152 of the shaft 15 is inserted into the bearing 18.

A step-shape part 23 is formed on a radial outside of the rear frame end 20. A connector 55 is disposed in the step-shape part 23. A projection part 555 is formed on an outer circumference part of the connector 55.

Further, two motor line extraction parts 25 are formed on the rear frame end 20. The first motor line 35 is inserted into one motor line extraction part 25, and the second motor line 45 is inserted into the other one of the motor line extraction part 25.

A cover member 29 is formed in a cylinder shape with one end of the cylinder closed to be serving as a bottom, and is fixedly attached on the rear frame end 20 with an outer opening part of the connector 55 relative to the projection part 555 exposed from the connector 55.

The substrate 51 is a multilayer printed circuit board, for example, and is fixed onto the rear frame end 20 (i.e., on one surface of the rear frame end 20) facing away from the motor 10 with a screw 59. Further, the connector 55 is connected to the substrate 51.

The switching elements 61-66, 71-76, the rotation angle sensor 86, and ASIC 87 are surface-mounted on a first side 52 of the substrate 51, which faces the motor 10. The switching elements 61-66, 71-76 and ASIC 87 are arranged to dissipate heat from their backs to the rear frame end 20 via a heat dissipation gel (not illustrated). That is, in the present embodiment, the rear frame end 20 serves as an outer shell of the motor 10, and also serves as a heat sink. Thereby, the number of components in the motor 10 is reduced, in comparison to a configuration in which the heat sink is separately provided as an individual component.

The choke coil 80, the capacitors 81 and 82, and the microcomputer 85 are mounted on a second side 53, which is the other side of the substrate 51 facing away from the motor 10.

In the present embodiment, by surface-mounting the large components such as the choke coil 80 and the capacitors 81 and 82 on the second side 53 of the substrate 51 (i.e., the largeness of the coil 80 and the capacitor 81 and 82 determined in comparison with the switching elements 61-66 and 71-76), the substrate 51 is positioned close to the rear frame end 20, thereby enabling an efficient heat dissipation from the backs of those electric components on the first side 52 of the substrate 51 to the rear frame end 20.

Further, in the present embodiment, since the switching elements 61-66, 71-76, the choke coil 80, the capacitor 81 and 82, the microcomputer 85, the rotation angle sensor 86, and ASIC 87 are mounted on one substrate 51, the number of components in the motor 10, and the size of the motor 10 are reduced, in comparison to using two or more substrates.

The motor line 35 is arranged on the radial outside of the switching elements 61-66, and is connected with the substrate 51. The motor line 45 is arranged on the radial outside of the switching elements 71-76, and is connected with the substrate 51.

In the present embodiment, the motor lines 35 and 45 are arranged in a U-V-W order, (i.e., in a clockwise manner from the U1 motor line 36, to the V1 motor line 37, and to the W1 motor line 38; and from the U2 motor line 46, the V2 motor line 47, and to the W2 motor line 48), which is a point-symmetric arrangement concentrically on one circle in terms of corresponding phases around the axial center of the motor 10 (i.e., around the rotation angle sensor 86).

Figure 8:
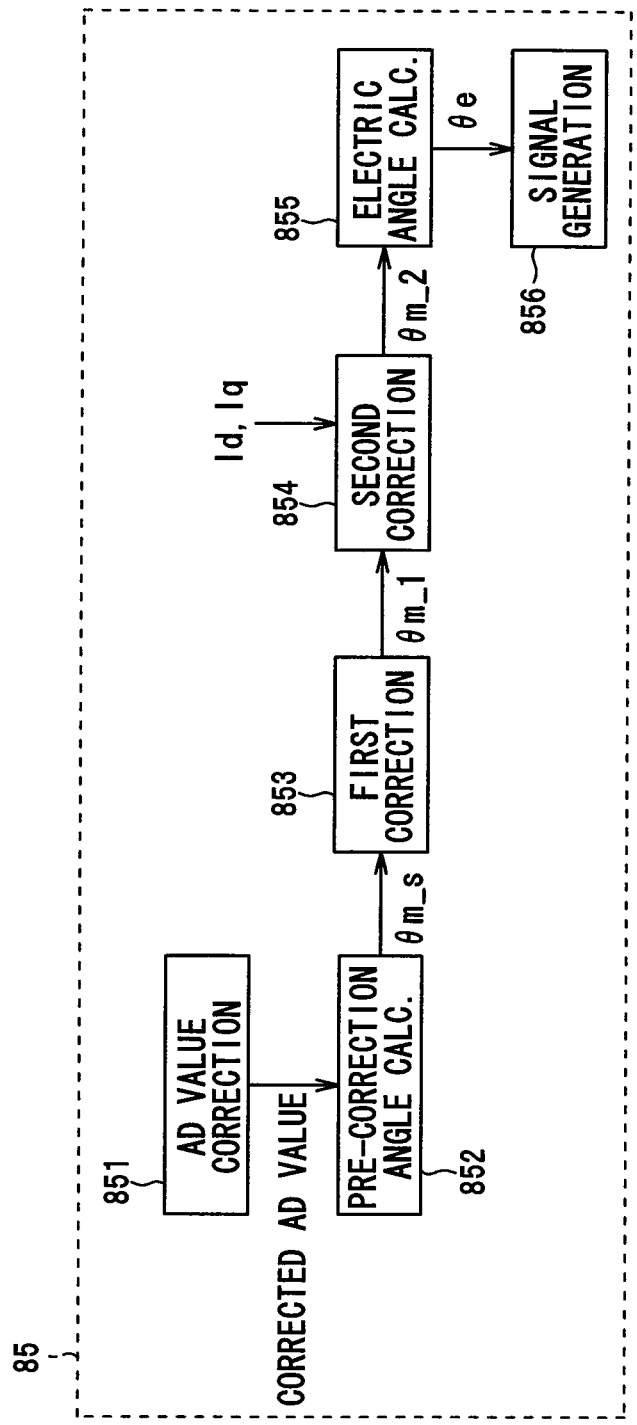
FIG. 8 is a block diagram of a microcomputer in the first embodiment of present disclosure.

As shown in FIG. 8, the microcomputer 85 has an Analog Digital (AD) value corrector 851, a pre-correction angle calculator 852, a first corrector 853, a second corrector 854, an electric angle calculator 855, and a signal generating part 856 as its functional blocks.

The AD value corrector 851 corrects the detection value of the rotation angle sensor 86, which is a value after an Analog/Digital (A/D) conversion performed thereon, and calculates a corrected AD value.

The pre-correction angle calculator 852 calculates a pre-correction mechanical angle $\theta m\_s$ based on the corrected AD value.

The first corrector 853 calculates a first corrected mechanical angle $\theta m\_1$ based on a first correction value $\Delta\theta 1$ for correcting an error of angle caused by an assembly error.

When both of the center of the magnet 19 and the center of the rotation angle sensor 86 are positioned on the motor shaft line O, and when a sensor side surface of the magnet 19 facing the rotation angle sensor 86 and a magnet side surface of the rotation angle sensor 86 are in parallel with each other, no detection error is caused.

However, due to an assembly error, (i.e., when the center of the magnet 19 is shifted from the center of the rotation angle sensor 86, or when at least one of the two surfaces on the magnet 19 or on the rotation angle sensor 86, is tilted), the pre-correction mechanical angle θm_s is detected as a value that is different from an actual mechanical angle θm.

The first correction value Δθ1 for correcting an error of angle caused by an assembly error is derived by a drive of the motor 10 with an external force (for a preset rotation angle).

Derivation of the first correction value Δθ1 may be performed before the assembly of the speed reduction gear 89, or may be performed in an assembled state in which the motor 10 and the speed reduction gear 89 are assembled with each other.

By deriving the first correction value Δθ1, where the motor 10 and the speed reduction gear 89 are attached, it can be considered as the correction value which considered an assembly error with the speed reduction gear 89.

Figure 9A:
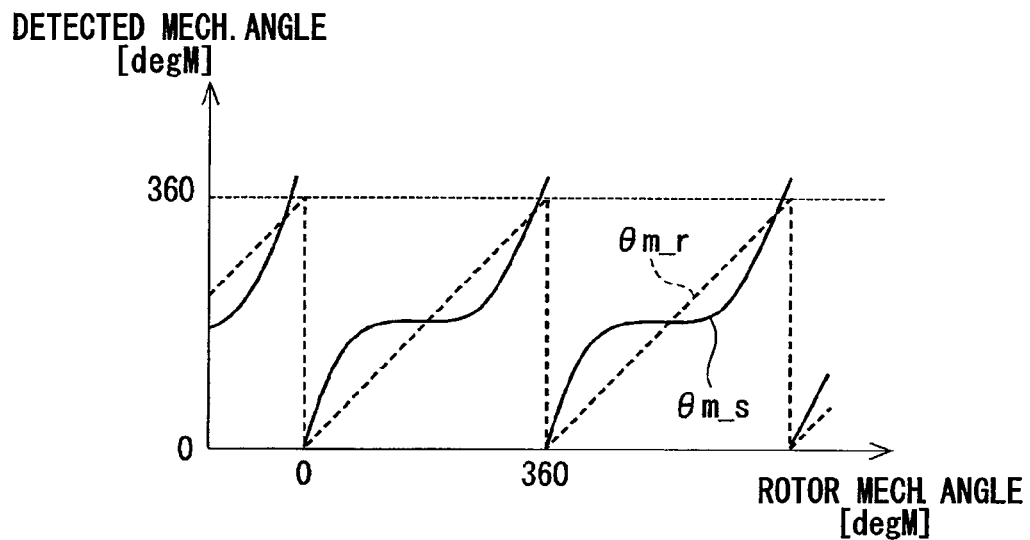
FIGS. 9A/B are graphs of a first correction value in the first embodiment of present disclosure.

When a drive of the motor 10 by the external force is performed for a preset rotation angle as shown in FIG. 9A, an ideal mechanical angle θm_r, which is assumed to have no assembly error, is detected as identical to the actual mechanical angle of the rotor 14, as represented by a dashed line.

On the other hand, when an assembly error is caused, the pre-correction mechanical angle θm_s is diverted from the ideal mechanical angle θm_r, which results in that the ideal mechanical angle θm_r and the pre-correction mechanical angle θm_s take two different values.

Figure 9B:
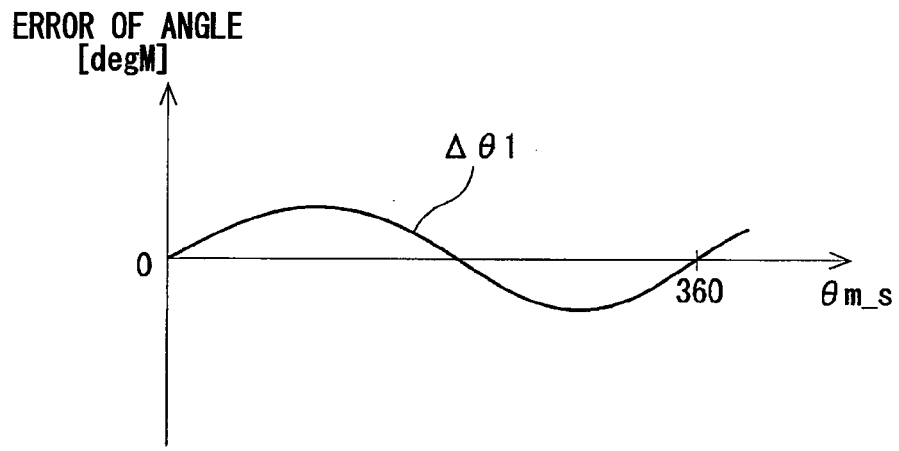

Therefore, as shown in FIG. 9B, a difference between the pre-correction mechanical angle θm_s at a time of driving the motor 10 for a preset rotation angle and the ideal mechanical angle θm_r is set as the first correction value Δθ1.

Since the first correction value Δθ1 is the correction value caused by an assembly error, it is assumed as a constant value regardless of the electric current. The first correction value Δθ1 is stored as a map in a storage or in a memory (not illustrated) in association with the pre-correction mechanical angle θm_s, and is used for the correction for correcting the pre-correction mechanical angle θm_s.

For the derivation of the first correction value Δθ1, instead of driving the motor 10 by the external force, the motor 10 may be driven by a small electric current for the preset rotation angle, in which a spill magnetic flux is ignorable.

The first corrected mechanical angle θm_1 is represented with an equation (1).

$$\theta\theta m\_1 = \theta m\_s - \Delta\theta 1 \qquad \text{Equation (1)}$$

The second corrector 854 corrects the first corrected mechanical angle θm_1 based on a second correction value Δθ2 which corrects the error caused by the spill magnetic flux caused by a supply of the electric current, and calculates a second corrected mechanical angle θm_2.

In FIG. 8, a d axis current Id and a q axis current Iq are inputted to the second corrector 854. However, a phase current Iu1, Iv1, Iw1, Iu2, Iv2, or Iw2 may also be inputted.

The calculation method of the second correction value Δθ2 for correcting an error of angle caused by the spill magnetic flux is mentioned later.

The electric angle calculator 855 calculates an electric angle θe based on the second corrected mechanical angle θm_2 calculated by the second corrector 854.

The signal generator 856 calculates a voltage instruction value that is to be applied to the winding groups 30, 40 based on the electric angle θe, for an electric current feedback control, and generates and outputs a control signal for controlling an ON-OFF operation of the switching elements 61-66, 71-76 based on the voltage instruction value. In such manner, the drive of the motor 10 is controlled.

The calculation method of the second correction value Δθ2 for correcting an error of angle caused by the spill magnetic flux is hereafter described.

In the present embodiment, the motor lines 35 and 45 are arranged on the radial outside of the magnet 19 and the rotation angle sensor 86. More specifically, the motor lines 35 and 45 are arranged on the mounting surface on which the rotation angle sensor 86 is also mounted, at the radial outside positions, or at the periphery of such a mounting surface. Therefore, under the influence of the spill magnetic flux generated by the electric current supplied and flowing in the motor lines 35 and 45, the pre-correction mechanical angle θm_s takes a different value from the actual mechanical angle θm.

In the present embodiment, the q axis current is assumed as a predetermined standard q axis current Iq_b (e.g., 100 [A]), the second correction value Δθ2 is calculated. In such case, the d axis current Id is assumed as zero. In the present embodiment, the value of the standard q axis current Iq_b is "information regarding the electric current flowing in the connection line."

An effective value Ie of the phase current when the standard q axis current Iq_b is supplied is represented with an equation (2).

$$Ie = Iq\_b/(\sqrt{3}) \qquad \text{(Equation 2)}$$

The maximum value of the phase current is $(\sqrt{2}) \times Ie$, and the maximum value of the phase current of the one of the two systems is $\{(\sqrt{2})/2\} \times Ie$.

Phase difference between the U phase, the V phase and the W phase is set to 120 degrees. Further, an amount of the phase difference between the first system 101 and the second system 102 is set to ±a[°] (e.g., ±15 degrees).

In other words, the phase difference between the peaks of the first system 101 and the second system 102 is 2a [°].

The U1 electric current Iu1, the V1 electric current Iv1, the W1 electric current Iw1, the U2 electric current Iu2, the V2 electric current Iv2, and the W2 electric current Iw2 are represented with equations (3-1)-(3-6).

$$Iu1 = \{(\sqrt{2})/2\} \times Ie \times \sin(\theta e - a) \qquad \text{(Equation 3-1)}$$

$$Iv1 = \{(\sqrt{2})/2\} \times Ie \times \sin(\theta e - 120° - a) \qquad \text{(Equation 3-2)}$$

$$Iw1 = \{(\sqrt{2})/2\} \times Ie \times \sin(\theta e + 120° - a) \qquad \text{(Equation 3-3)}$$

$$Iu2 = \{(\sqrt{2})/2\} \times Ie \times \sin(\theta e + a) \qquad \text{(Equation 3-4)}$$

$$Iv2 = \{(\sqrt{2})/2\} \times Ie \times \sin(\theta e - 120° + a) \qquad \text{(Equation 3-5)}$$

$$Iw2 = \{(\sqrt{2})/2\} \times Ie \times \sin(\theta e + 120° + a) \qquad \text{(Equation 3-6)}$$

Hereafter, the description is focused on an influence of the magnetic field generated by the U1 electric current Iu1, and the description about the influence of the magnetic field generated by the other electric currents, i.e., of the V1 electric current Iv1, the W1 electric current Iw1, the U2 electric current Iu2, the V2 electric current Iv2, and the W2 electric current Iw2, is omitted due to its symmetric nature.

When the motor lines 35 and 45 are considered as infinitely extending, the intensity H of the magnetic field H is represented with an equation (4) based on Biot-Savart's law.

$$H = I/(2\pi r) \quad \text{(Equation 4)}$$

H: Magnetic field intensity
I: Electric current
r: Distance

When a distance between the rotation angle sensor 86 and the U1 motor line 36 is designated as 'ru1', and an equation (3-1) is substituted for the electric current I in the equation (4), the magnetic field intensity Hu1 by the electric current flowing in the U1 motor line 36 at the position of the rotation angle sensor 86 is represented with an equation (5-1).

$$Hu1 = Iu1/(2\pi \times ru1) \quad \text{(Equation 5-1)}$$

Similarly, when distances between the rotation angle sensor 86 and the V1 motor line 37, the W1 motor line 38, the U2 motor line 46, the V2 motor line 47, and the W2 motor lines 48 respectively designated as 'rv1', 'rw1', 'ru2', 'rv2', and 'rw2', the magnetic field intensity Hv1 by the electric current flowing in the V1 motor line 37 at the position of the rotation angle sensor 86, as well as the intensities Hw1, Hu2, Hv2, and Hw2 at the same position are represented with equations (5-2)-(5-6).

$$Hv1 = Iv1/(2\pi \times rv1) \quad \text{(Equation 5-2)}$$

$$Hw1 = Iw1/(2\pi \times rw1) \quad \text{(Equation 5-3)}$$

$$Hu2 = Iu2/(2\pi \times ru2) \quad \text{(Equation 5-4)}$$

$$Hv2 = Iv2/(2\pi \times rv2) \quad \text{(Equation 5-5)}$$

$$Hw2 = Iw2/(2\pi rw2) \quad \text{(Equation 5-6)}$$

Further, the magnetic field intensity is converted to the magnetic flux density by an equation (6).

$$B = \mu \times H \quad \text{(Equation 6)}$$

The signs used in the equation (6) are as follows.
B: Magnetic flux density
$\mu$: Space permeability($=1.257 \times 10^{-6}$ [H/m])
H: Magnetic field intensity If the equations (5-1)-(5-6) are substituted for H of the equation (6), the magnetic flux density Bu1 by the U1 electric current Iu1 at the position of the rotation angle sensor 86, as well as the magnetic flux density Bv1 by the V1 electric current Iv1, the magnetic flux density Bw1 by the W1 electric current Iw1, the magnetic flux density Bu2 by the U2 electric current Iu2, the magnetic flux density Bv2 by the V2 electric current Iv2 and the magnetic flux density Bw2 by the W2 electric current Iw2 at the same position are represented with equations (7-1)-(7-6).

$$Bu1 = \mu \times Hu1 = \mu \times Iu1/(2\pi \times ru1) \quad \text{(Equation 7-1)}$$

$$Bv1 = \mu \times Hv1 = \mu \times Iv1/(2\pi \times rv1) \quad \text{(Equation 7-2)}$$

$$Bw1 = \mu \times Hw1 = \mu \times Iw1/(2\pi \times rw1) \quad \text{(Equation 7-3)}$$

$$Bu2 = \mu \times Hu2 = \mu \times Iu2/(2\pi \times ru2) \quad \text{(Equation 7-4)}$$

$$Bv2 = \mu \times Hv2 = \mu \times Iv2/(2\pi \times rv2) \quad \text{(Equation 7-5)}$$

$$Bw2 = \mu \times Hw2 = \mu \times Iw2/(2\pi \times rw2) \quad \text{(Equation 7-6)}$$

Figure 10:
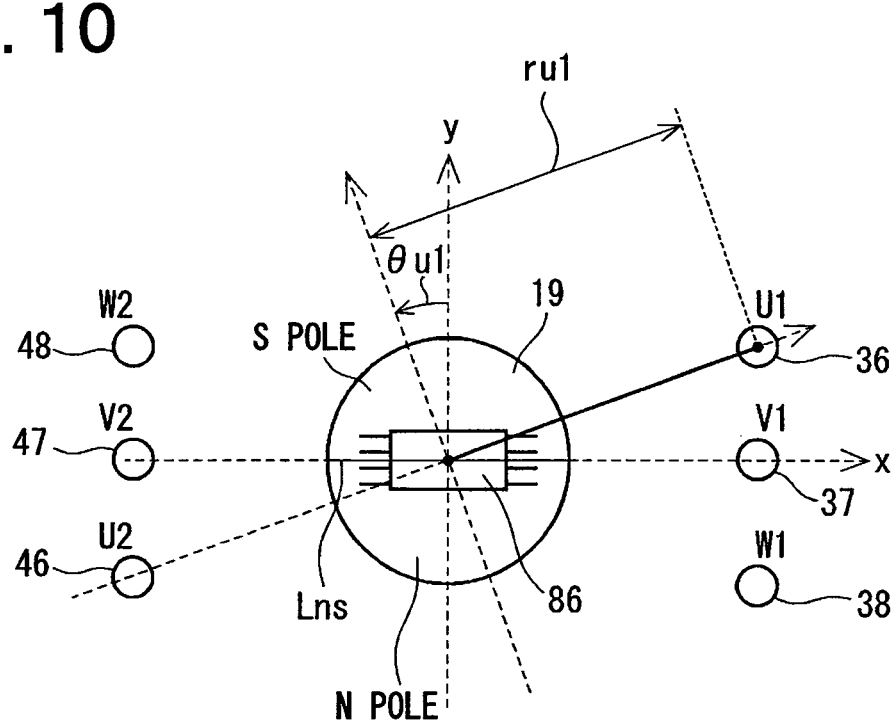
FIG. 10 is an illustration of an arrangement of a rotation angle sensor, a magnet, and a motor line by the first embodiment of present disclosure.
Figure 11:
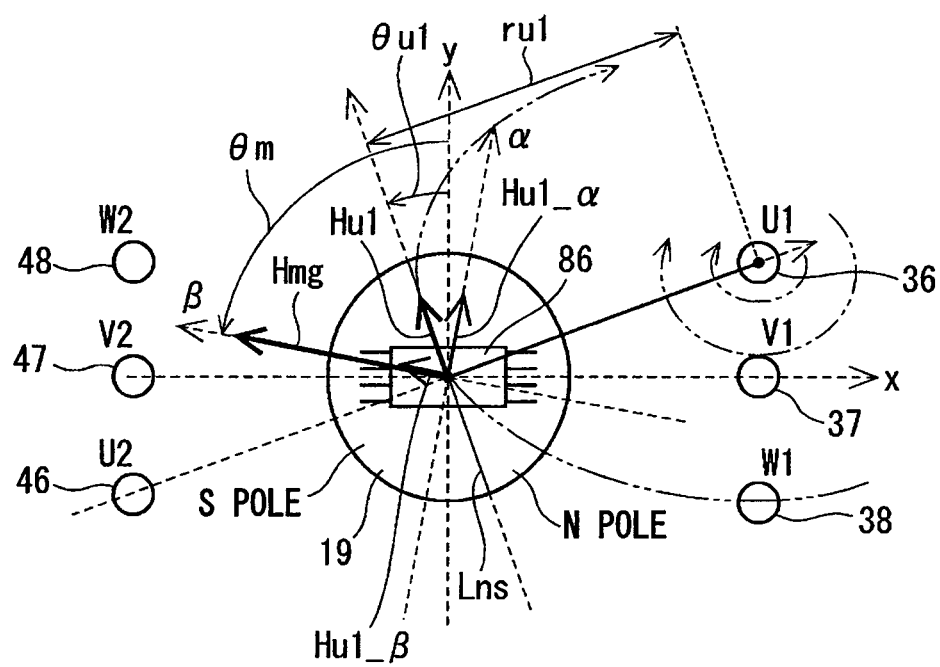
FIG. 11 is an illustration of a magnetic field caused by an electric current flowing in a magnet and in a U1 motor line in the first embodiment of present disclosure.
Figure 12:
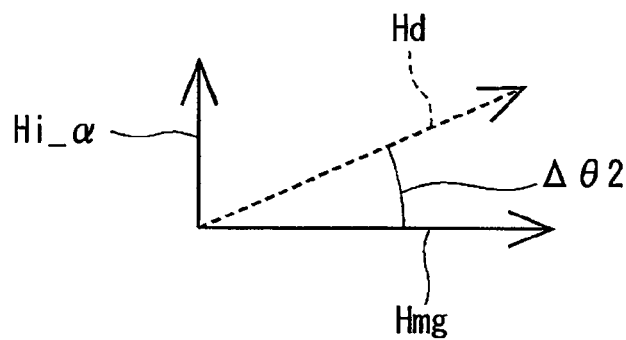
FIG. 12 is an illustration of a second correction value in the first embodiment of present disclosure.

Here, the magnetic field formed by the electric current flowing in the motor lines 35 and 45 is described based on FIGS. 10-12.

As shown in FIG. 10, in the present embodiment, an origin of an x-y coordinate is set to the center of the rotation angle sensor 86, and x-y axes of such coordinate are respectively set as direction along a longer side and a shorter side of the rotation angle sensor 86. Further, in such x-y coordinate, an angle between a line extending from the origin to the U1 motor line 36 and the x axis is designated as $\theta u1$. Further, as shown in FIG. 10, the angle $\theta u1$ may also be considered as an angle between a perpendicular line that is perpendicular to the line extending from the origin to the U1 motor line 36 and the y axis. Similarly, an angle between a line extending from the origin to the V1 motor line 37 and the x axis is designated as $\theta v1$, an angle between a line extending from the origin to the W1 motor line 38 and the x axis is designated as $\theta w1$, an angle between a line extending from the origin to the U2 motor line 46 and the x axis is designated as $\theta u2$, an angle between a line extending from the origin to the V2 motor line 47 and the x axis is designated as $\theta v2$, and an angle between a line extending from the origin to the W2 motor line 48 and the x axis is designated as $\theta w2$.

In the present embodiment, since the V1 motor line 37 is arranged on a positive side of the x axis, the angle $\theta v1$ is equal to 0°, and since the V2 motor line 47 is arranged on the x axis of a negative side, the angle $\theta v2$ is equal to 180°.

As shown in FIG. 11, a rotating coordinate that rotates with a rotation of the magnet 19 is designated as an $\alpha$-$\beta$ coordinate. In the present embodiment, a boundary line between the N pole and the S pole of the magnet 19 is set as an $\alpha$ axis, and a perpendicular-to-$\alpha$ axis is set as a $\beta$ axis. Further, the S pole side is set as positive, and the N pole side is set as negative. Based on such setting, the magnetic field intensity Hmg of the magnet 19 is represented as a vector, and this vector points to a positive direction of the $\beta$ axis.

In the present embodiment, a reference position is defined as the x axis (i.e., when the $\alpha$ axis is on the x axis), and the mechanical angle $\theta m$ at such time is defined as zero. In other words, an angle between the y axis and the $\beta$ axis is designated as the mechanical angle $\theta m$.

Here, a component of the spill magnetic flux generated by the electric current flowing in the U1 motor line 36 is described. In the present embodiment, a component of the spill magnetic flux of the electric current, which intersects perpendicularly with the magnetic field of the magnet 19, is calculated.

When the electric current flows in the U1 motor line 36, a magnetic field as shown in FIG. 11 by a two-dot chain line is formed. Further, the magnetic field intensity Hu1 by the electric current flowing in the U1 motor line 36, and the magnetic field intensity Hmg of the magnet 19 are respectively represented as a vector as shown in FIG. 11. Further, the magnetic field intensity Hu1 is decomposed into a vector Hu1_$\alpha$ along the $\alpha$ axis direction, and a vector Hu1_$\beta$ along the $\beta$ axis direction. The magnetic field intensities by the electric current flowing in other motor lines are also decomposable to the $\alpha$ axis component and the $\beta$ axis component.

Further, the component of the spill magnetic flux along the $\beta$ axis, which is in parallel with the magnetic field of the magnet 19, is ignored since such a component of the spill magnetic flux is small enough in comparison to the magnetic flux density Bmg (e.g., 30 [mT]) of the magnet 19.

As shown in FIG. 12, the rotation angle sensor 86 detects a composed vector Hd as a combination of a vector Hmg representing the magnetic field intensity of the magnet 19 and a vector Hi_$\alpha$ representing the spill magnetic field along the $\alpha$ axis direction by the electric current flowing in the motor lines 35 and 45. Therefore, when an assembly error is assumed as zero, the actual mechanical angle θm is shifted from the pre-correction mechanical angle θm_s by an angle between the magnetic field intensity vector Hmg of the magnet 19 and the composed vector Hd, which is an error of angle. Therefore, an angle between the magnetic field intensity vector Hmg of the magnet 19 and the composed vector Hd is set as the second correction value Δθ2 in the present embodiment.

An α axis component Bu1_α of the magnetic flux density by the electric current flowing in the U1 motor line 36 is represented with an equation (8-1).

$$Bu1\_\alpha = Bu1 \times \cos(\theta m\_s + \theta u1) \quad \text{(Equation 8-1)}$$

Similarly, an α axis component Bv1_α of the magnetic flux density by the electric current flowing in the V1 motor line 37 as well as α axis components Bw1_α, Bu2_α, Bv2_α, and Bw2_α by the electric currents flowing in the W1 motor line 38, the U2 motor line 46, the V2 motor line 47, and the W2 motor line 48 are respectively represented with equations (8-2)-(8-6).

$$Bv1\_\alpha = Bv1 \times \cos(\theta m\_s + \theta v1) \quad \text{(Equation 8-2)}$$

$$Bw1\_\alpha = Bw1 \times \cos(\theta m\_s + \theta w1) \quad \text{(Equation 8-3)}$$

$$Bu2\_\alpha = Bu2 \times \cos(\theta m\_s + \theta u2) \quad \text{(Equation 8-4)}$$

$$Bv2\_\alpha = Bv2 \times \cos(\theta m\_s + \theta v2) \quad \text{(Equation 8-5)}$$

$$Bw2\_\alpha = Bw2 \times \cos(\theta m\_s + \theta w2) \quad \text{(Equation 8-6)}$$

A total magnetic flux density Bi_α, which is calculated as a sum total of the α axis components of the magnetic flux density by the electric currents flowing in the motor lines 35 and 45, is represented with an equation (9). Further, the total magnetic flux density Bi_α is considered as a magnetic flux density conversion value of the vector Hi_α in FIG. 12.

$$Bi\_\alpha = Bu1\_\alpha + Bv1\_\alpha + Bw1\_\alpha + Bu2\_\alpha + Bv2\_\alpha + Bw2\_\alpha \quad \text{(Equation 9)}$$

A standard second correction value Δθ2_b, which is an error of angle when the standard q axis current Iq_b is supplied is represented with an equation (10). In such case, Bmg in the equation (10) represents a magnetic flux density of the magnet 19.

$$\Delta\theta2\_b = \text{DEGREES}(A\,\text{TAN}(Bi\_\alpha/Bmg)) \quad \text{(Equation 10)}$$

Figure 13:
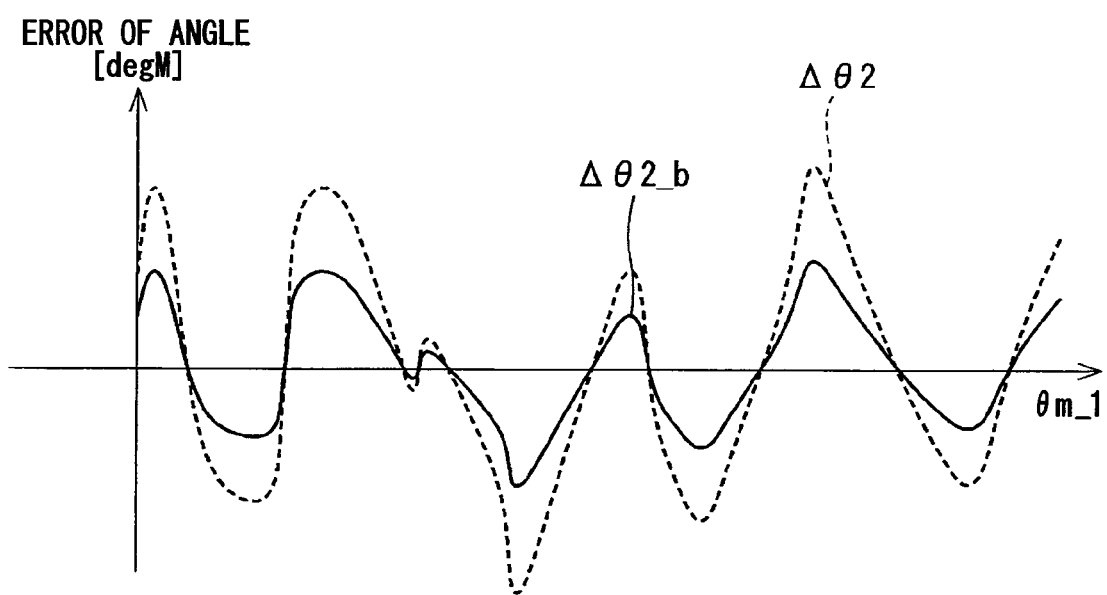
FIG. 13 is a graph of the second correction value in the first embodiment of present disclosure.

The standard second correction value Δθ2_b is shown in FIG. 13 by a solid line, which is memorized as a map in the non-illustrated storage in association with the first corrected mechanical angle θm_1. Alternatively, the standard second correction value Δθ2_b may be stored in association with the pre-correction mechanical angle θm_s.

The second corrector 854 calculates the second correction value Δθ2 based on the detected q axis current Iq_d which is the q axis current supplied to the motor lines 35 and 45 and the standard second correction value Δθ2_b that is associated with the first corrected mechanical angle θm_1. The second correction value Δθ2 is represented with an equation (11). The second correction value Δθ2 is shown in FIG. 13 by a dashed line.

$$\Delta\theta2 = \Delta\theta2\_b \times (Iq\_d/Iq\_b) \quad \text{(Equation 11)}$$

As a supplemental note about the equation (11), it may be described that the second correction value Δθ2 is calculated as a linear interpolation of the standard second correction value Δθ2_b. Further, when a term (Iq_d/Iq_b) in the equation (11) is considered as a correction gain, it may also be described that the second correction value Δθ2 is calculated by multiplying the standard second correction value Δθ2_b by the correction gain.

Further, a second corrected mechanical angle θm_2 is represented with an equation (12).

$$\theta m\_2 = \theta m\_1 - \Delta\theta2 \quad \text{(Equation 12)}$$

Thereby, the second corrected mechanical angle θm_2 substantially matches the actual mechanical angle θm.

The second corrected mechanical angle θm_2 calculated in the above-described manner is outputted to the electric angle calculator 855, and it is used for the calculation of the electric angle θe. Further, the calculated electric angle θe is used for various calculations.

As fully described in detail, the rotation angle detector 1 detects a rotation angle of the motor 10 that includes the shaft 15, the rotor 14 that rotates with the shaft 15, and the stator 12 on which the windings 30 and 40 are wound (i.e., detects the mechanical angle θ), and includes the rotation angle sensor 86 and the microcomputer 85.

The rotation angle sensor 86 detects a change of the magnetic field of the magnet 19, which rotates in one body with the shaft 15.

The microcomputer 85 is provided with the pre-correction angle calculator 852, the first corrector 853, and the second corrector 854.

The pre-correction angle calculator 852 calculates the pre-correction mechanical angle θm_s based on the detection value of the rotation angle sensor 86.

The first corrector 853 corrects the pre-correction mechanical angle θm_s based on the first correction value Δθ1 which corrects an error of angle due to an assembly error of the magnet 19 and the rotation angle sensor 86.

The second corrector 854 corrects the pre-correction mechanical angle θm_s based on the second correction value Δθ2 which corrects an error of angle generated by the spill magnetic flux due to the supply of the electric current to windings 30 and 40.

Although in the present embodiment, the first corrected mechanical angle θm_1 corrected based on the first correction value Δθ1 is further corrected by the second correction value Δθ2, correcting the first corrected mechanical angle θm_1 based on the second correction value Δθ2 is also considered to correspond to a concept of "correcting the pre-correction mechanical angle based on the second correction value."

In the present embodiment, the initial error caused by an assembly error is appropriately corrected by the correction with the first correction value Δθ1. Further, an error of angle caused by the spill magnetic flux due to the supply of the electric current is corrected with the second correction value Δθ2.

In such manner, the arrangement of the motor lines 35 and 45 cannot be arranged, for example, due to the restriction of manufacturing etc., at mutually-cancelling positions. As such, the error of angle caused by the spill magnetic flux is appropriately corrected. Therefore, regardless of the position and/or the structure of the components, the rotation angle θm of the rotating electric machine 10 is accurately detected.

In the present embodiment, the motor lines 35 and 45 are disposed on the mounting surface on which the rotation angle sensor 86 is mounted, and the influence of the spill magnetic flux is relatively large in such structure. Therefore, the correction by the second correction value Δθ2 is especially beneficial and effective.

The motor lines 35 and 45 connected with the windings 30 and 40 are disposed on the mounting surface on which the rotation angle sensor 86 is mounted. In the present embodiment, the motor lines 35 and 45 are disposed on the substrate 51 on which the rotation angle sensor 86 is mounted, and a motor 10 facing side of the substrate 51 is the "mounting surface."

Here, the "mounting surface" is not necessarily a surface of the substrate 51. That is, for example, the motor lines 35 and 45 may be positioned outside of the substrate 51.

The second correction value Δθ2 is a value calculated based on the distance between the rotation angle sensor 86 and the motor lines 35 and 45, and based on the information of the electric current flowing in the motor lines 35 and 45 (i.e., in the present embodiment, the standard q axis current Iq_b). Thereby, an error of angle caused by the spill magnetic flux is appropriately corrected.

Further, the second correction value Δθ2 is calculated based on (i) the second standard correction value, which is an error of angle when the predetermined q axis current is supplied and (ii) the q axis current supplied to windings 30 and 40. Thereby, an error of angle caused by the spill magnetic flux generated by the q axis current Iq is appropriately corrected.

The first correction value Δθ1 is a value based on the difference between the detection angle θs, and the ideal mechanical angle θm_r when the motor 10 is driven for a preset rotation angle.

Thereby, the error caused by an assembly error is appropriately corrected.

The first correction value Δθ1 is a value based on the difference of the detection angle θs and the ideal mechanical angle θm_r, after an assembly of the motor 10 and the speed reduction gear 89.

Thereby, in consideration of an assembly error of the rotation object to which a rotation of the motor 10 is output, an error of angle due to the assembly is more appropriately corrected.

The angle calculator 852 of the microcomputer 85 serves as a "pre-correction angle calculator," the first corrector 853 serves as a "first corrector," and the second corrector 854 serves as a "second corrector" in the present embodiment.

These elements may be implemented as the software processes by executing a program memorized in advance by CPU, or may be implemented as the hardware processes by the dedicated electronic circuits.

Second Embodiment

Figure 14:
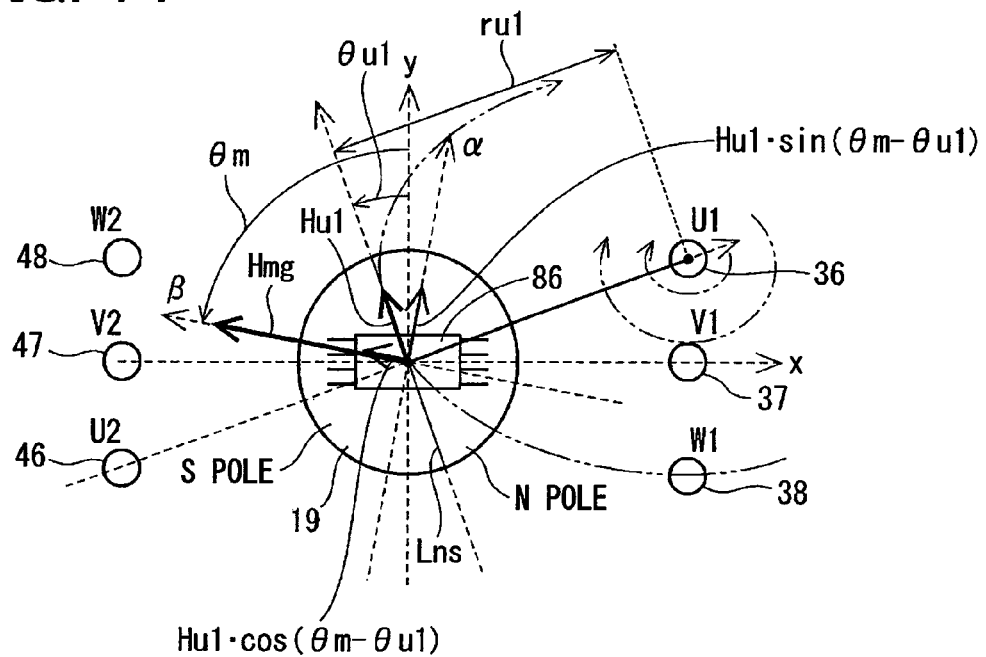
FIG. 14 is an illustration of a magnetic field caused by an electric current flowing in the magnet and in the U1 motor line in a second embodiment of present disclosure.

The second embodiment of the present disclosure is described based on FIG. 14.

In the present embodiment, the calculation method of the second correction value Δθ2 is different from the above-mentioned embodiment.

The spill magnetic flux generated by the electric current flowing in the motor lines 35 and 45 changed according to the number of magnetic poles of the rotor 14. Therefore, the second correction value Δθ2 in the present embodiment is calculated in consideration of the number of magnetic poles of the rotor 14.

When a U phase current Iu is defined as an electric current flowing in the U phase of both of the first system 101 and the second system 102, and the number of magnetic pole pairs is 'n', the U1 electric current Iu1 is represented with an equation (13). In the equation (13), a term nθm is a conversion value of the mechanical angle θm converted to the electric angle θe.

$$Iu1 = -Iu \times \sin(n\theta m + a) \quad \text{(Equation 13)}$$

Based on the equation (13) and the equation (5-1), the α axis component Hu1_α of the magnetic field intensity by the U1 electric current Iu1 is represented with an equation (14).

$$Hu1\_a = -Hu1 \cdot \sin(\theta m - \theta u1) =$$
$$-\frac{Iu1}{2\pi \cdot ru1} \cdot \sin(n\theta m + a) \cdot \sin(\theta m - \theta u1) =$$
$$-\frac{Iu1}{2\pi \cdot ru1} \cdot \frac{[\cos\{(n-1)\theta m + a - \theta u1\} - \cos\{(n+1)\theta m + a + \theta u1\}]}{2}$$
(Equation 14)

As shown in the equation (14), the α axis component Hu1_α of the magnetic field intensity is represented as a composite function of the trigonometric functions composed from an (n−1)th component and an (n+1)th component, when the number of magnetic pole pairs is 'n'.

The α axis components of the magnetic field intensity may also be calculated as Hv1_α, Hw1_α, Hu2_α, Hv2_α, and Hw2_α about the V1 electric current Iv1, the W1 electric current Iw1, the U2 electric current Iu2, the V2 electric current Iv2, and the W2 electric current Iw2. Further, by replacing the number θm in the equations with the first corrected mechanical angle θm_1, and converting the axis component of the magnetic field intensity of each of those phases into the magnetic flux density; and by calculating the arc tangent just like the equation (10), the second correction value Δθ2 is calculated.

The rotor 14 has n pole pairs (i.e., in the present embodiment, five pole pairs).

The second correction value Δθ2 is a value calculated based on the magnetic field intensity represented with the composite function of the trigonometric functions of the (n−1)th component and the (n+1)th component.

Thereby, according to the number of magnetic pole pairs of the rotor 14, an error of angle caused by the spill magnetic flux is appropriately corrected. Further, the same effects as the above-mentioned embodiment are also achieved.

Third Embodiment

The third embodiment of the present disclosure is described in the following.

In the above-mentioned embodiments, the second correction value Δθ2 is calculated in consideration of the phase difference under the influence of the d axis current Id.

An equation (15) is a converted equation of the equation (14) in terms of the phase current Iu.

$$Iu = \frac{\sqrt{iq^2 + id^2}}{2\sqrt{\frac{3}{2}}} \quad \text{(Equation 15)}$$

Further, a phase difference D in consideration of the d axis current is represented with an equation (16).

$$D = A\,\text{TAN}(Id/Iq) \quad \text{(Equation 16)}$$

When the equation (14) is converted by the equations (15) and (16), it makes up an equation (17).

$$Hu1\_a = -Hu1 \cdot \sin(\theta m - a) = \qquad \text{(Equation 18)}$$

$$\frac{\left\{-\sqrt{iq^2 + id^2} \bigg/ 2\sqrt{\frac{3}{2}} \bigg/ (2\pi \cdot ru1)\right\} \cdot [\cos\{(n+1)\theta m + a + \theta u1 - D\} - \cos\{(n-1)\theta m + a + \theta u1 - D\}]}{2}$$

The α axis components of the magnetic field intensity are also calculated as Hv1_α, Hu2_α, Hv2_α, and Hw2_α about the V1 electric current Iv1, the W1 electric current Iw1, the U2 electric current Iu2, the V2 electric current Iv2, and the W2 electric current Iw2.

Further, by replacing the number θm in the equations with the first corrected mechanical angle θm_1, and converting the axis component of the magnetic field intensity of each of those phases into the magnetic flux density and by calculating the arc tangent just like the equation (10), the second correction value Δθ2 is calculated.

Figure 15:
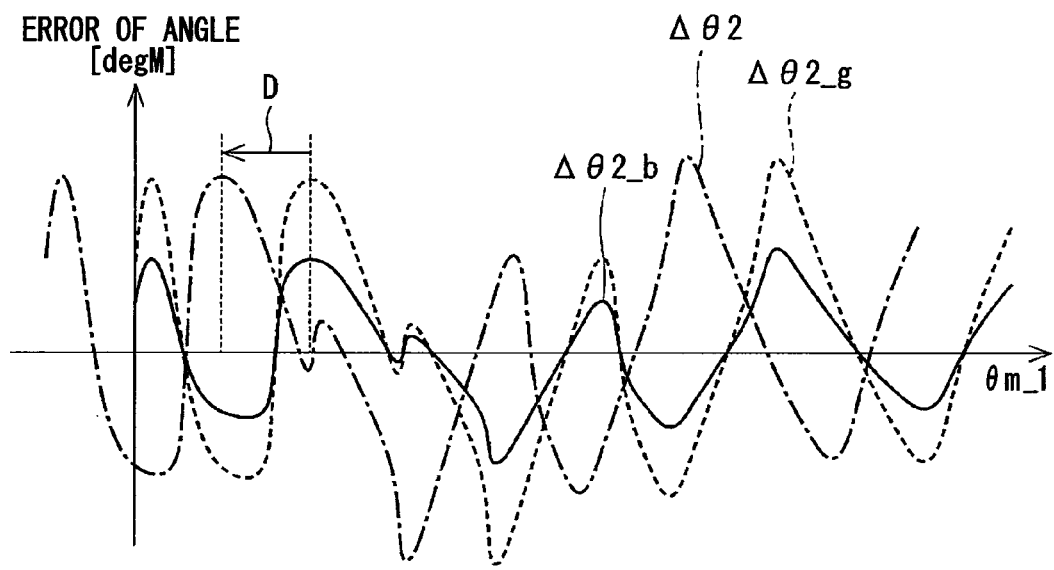
FIG. 15 is a graph of the second correction value in a third embodiment of present disclosure.

Further, as shown in FIG. 15, the standard second correction value Δθ2_b, which is not corrected by the phase difference D, may be prepared as a map. Also, the second correction value Δθ2 may be calculated by subtracting the phase difference D from a value Δθ2_g that is derived from multiplication of the Δθ2_b, by the correction gain that is a ratio of the detected q axis current Iq_d against the standard q axis current Iq_b.

In FIG. 15, the standard second correction value Δθ2_b is represented by a solid line, a value Δθ2_g after the multiplication of the correction gain is represented by a dashed line, and the second correction value Δθ2 after a subtraction of the phase difference D is represented by a one-dot chain line. Further, the value Δθ2_g after the multiplication of the correction gain in the present embodiment is the same value as the second correction value Δθ2 of the first embodiment.

In the present embodiment, the second correction value Δθ2 is a value calculated based on the phase difference D that is in accordance with the d axis current Id. Therefore, an error of angle caused by the spill magnetic flux generated by the flow of the d axis current in a high rotation number region is appropriately corrected. Further, the same effects as the above-mentioned embodiments are also achieved.

Other Embodiments (a) Rotation Angle Sensor

In the above-mentioned embodiment, the rotation angle sensor is an MR element.

In other embodiments, the rotation angle sensor is applicable not only realizable by the MR element but by any sensor that detects the magnetic flux (e.g., by a resolver or a Hall IC).

In the above-mentioned embodiment, the detectee is a magnet.

In other embodiments, the detectee is may be any article that enables the rotation angle sensor to detect a rotation position of the shaft and the rotor.

(b) Second Corrector

In the first embodiment, the standard second correction value is calculated in advance and stored as a map, for the calculation of the second correction value.

In other embodiments, the second corrector may be implemented as a calculation equation described in the above-mentioned embodiments, and the second correction value may be calculated on demand based on the actual current information (e.g., information about the q axis current actually supplied to the connection line) by the second corrector.

Alternatively, the calculation result of the second embodiment or the third embodiment may be prepared as a map, and the second correction value calculated by using such a map may be used by the second corrector for the error correction.

When calculating the standard second correction value in advance for making a map, the map making process may be performed by the second corrector or by the other component. The same applies to the first correction value.

(c) Drive Device

In the above-mentioned embodiment, the rotating electric machine in the drive device has two winding groups and two inverters, and is configured to have two systems.

In other embodiments, the number of systems may be only one system, or may be three systems or more.

In the above-mentioned embodiment, the rotating electric machine is a three-phase brushless motor.

In other embodiments, any electric motor other than the three-phase brushless motor may be usable as the rotating electric machine, or a generator may be usable as the rotating electric machine.

In the above-mentioned embodiment, the phase difference power supply with a ±15 degrees phase difference is performed.

In other embodiments, the phase difference between two or more systems may be not only 15 degrees but any degrees. Further, the phase difference among the systems may be a zero degree (i.e., the phase difference power supply needs not be performed).

In the above-mentioned embodiment, the arrangement of the motor lines is point-symmetric (i.e., in an order from the U1 motor line, the V1 motor line, the W1 motor line, the U2 motor line, the V2 motor line, to the W2 motor line).

In other embodiments, the position and the arrangement of the motor lines may be arbitrarily determined.

In the above-mentioned embodiment, the motor lines are connected with the substrate on which the rotation angle sensor is mounted.

In other embodiments, the motor lines may be connected with other substrates other than the one on which the rotation angle sensor is mounted, or may be connected with other component, etc.

In the above-mentioned embodiment, electronic components are mounted on one substrate.

In other embodiments, electronic components may be mounted on two or more substrates.

In the above-mentioned embodiment, the drive device is applied to an electric power steering device.

In other embodiments, the drive device may be applied to the devices other than the electric power steering device.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A rotation angle detector for detecting a rotation angle of a rotating electric machine that has a shaft, a rotor rotating with the shaft, and a stator having a winding wire wound on the stator, the rotation angle detector comprising:

a sensor part sensing a change of a magnetic field of a detectee that rotates with the shaft; and a controller including:

a pre-correction angle calculator calculating a pre-correction mechanical angle based on a detection value of the sensor part;

a first corrector correcting the pre-correction mechanical angle based on a first correction value that corrects an error of angle caused by an error in an assembly process for assembling the detectee and the sensor part; and a second corrector correcting the pre-correction mechanical angle based on a second correction value that corrects an error of angle due to a spill magnetic flux that is generated by a supply of an electric current to the winding wire.

2. The rotation angle detector of claim 1, wherein a connection line connected to the winding wire is arranged on a mounting surface on which the sensor part is mounted, and the second correction value is derived from information regarding (i) a distance between the sensor part and the connection line and (ii) an electric current flowing in the connection line.

3. The rotation angle detector of claim 1, wherein the rotor has a magnetic pole in pairs, a number of pairs of the magnetic poles is designated as 'n', and the second correction value is derived from a magnetic field intensity that is represented by a composition of trigonometric functions having an (n−1)th dimension and an (n+1)th dimension.

4. The rotation angle detector of claim 1, wherein the second correction value is calculated based on (i) a standard second correction value representing the error of angle when a q-axis electric current is supplied and (ii) a value of the q-axis electric current supplied to the winding wire.

5. The rotation angle detector of claim 1, wherein the second correction value is calculated based on a phase difference according to a d-axis electric current.

6. The rotation angle detector of claim 1, wherein the first correction value is calculated based on a difference between (i) a detection angle and (ii) an actual mechanical angle of the rotating electric machine after a drive of the rotating electric machine for a preset rotation angle.

7. The rotation angle detector of claim 6, wherein the first correction value is calculated as a value based on a difference between (i) the detection angle and (ii) the actual mechanical angle of the rotating electric machine after the drive of the rotating electric machine for the preset rotation angle, the drive of the rotating electric machine being performed in an assembled state of the rotating electric machine and a rotation object.

* * * * *